United States Patent
Nemeth et al.

(10) Patent No.: US 12,273,878 B2
(45) Date of Patent: Apr. 8, 2025

(54) METHOD AND APPARATUS FOR DYNAMIC CROSS-CARRIER SCHEDULING IN MOBILE COMMUNICATIONS

(71) Applicant: MediaTek Singapore Pte. Ltd., Singapore (SG)

(72) Inventors: Jozsef G. Nemeth, Cambridge (GB); Mohammed S. Aleabe Al-Imari, Cambridge (GB); Abdellatif Salah, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 330 days.

(21) Appl. No.: 17/764,638

(22) PCT Filed: Oct. 22, 2020

(86) PCT No.: PCT/CN2020/122734
§ 371 (c)(1),
(2) Date: Mar. 29, 2022

(87) PCT Pub. No.: WO2021/078189
PCT Pub. Date: Apr. 29, 2021

(65) Prior Publication Data
US 2022/0338226 A1    Oct. 20, 2022

Related U.S. Application Data

(60) Provisional application No. 62/924,815, filed on Oct. 23, 2019, provisional application No. 63/039,513, filed on Jun. 16, 2020.

(51) Int. Cl.
*H04W 72/12* (2023.01)
*H04L 1/1812* (2023.01)
(Continued)

(52) U.S. Cl.
CPC ....... *H04W 72/1273* (2013.01); *H04L 1/1812* (2013.01); *H04L 5/001* (2013.01);
(Continued)

(58) Field of Classification Search
CPC . H04W 72/1273; H04W 72/20; H04W 72/23; H04L 1/1812; H04L 5/001; H04L 5/0051; H04L 5/0053; H04L 5/0092
See application file for complete search history.

(56) References Cited

U.S. PATENT DOCUMENTS

2016/0359663 A1* 12/2016 Song ................. H04L 5/003
2018/0020430 A1  1/2018 Aiba et al.
(Continued)

FOREIGN PATENT DOCUMENTS

CN    102577291 A    7/2012
CN    103416015 A    11/2013
(Continued)

OTHER PUBLICATIONS

International Search Report and Written Opinion dated Jan. 20, 2021, issued in application No. PCT/CN2020/118802.
(Continued)

*Primary Examiner* — Jamal Javaid
(74) *Attorney, Agent, or Firm* — McClure, Qualey & Rodack, LLP

(57) ABSTRACT

Various solutions for dynamic cross-carrier scheduling with respect to user equipment and network apparatus in mobile communications are described. An apparatus may receive a physical downlink control channel (PDCCH) on a first component carrier (CC). The apparatus may receive a physical downlink shared channel (PDSCH) on the first CC scheduled by the PDCCH. The apparatus may determining a second CC to transmit a physical uplink control channel (PUCCH) according to a configuration of dynamic switch-
(Continued)

ing of CC. The apparatus may transmit the PUCCH corresponding to the PDSCH on the second CC scheduled by the PDCCH.

11 Claims, 8 Drawing Sheets

(51) Int. Cl.
  *H04L 5/00* (2006.01)
  *H04W 72/1273* (2023.01)
  *H04W 72/20* (2023.01)
(52) U.S. Cl.
  CPC .......... *H04L 5/0051* (2013.01); *H04L 5/0053* (2013.01); *H04W 72/20* (2023.01)

(56) References Cited

U.S. PATENT DOCUMENTS

| | | | |
|---|---|---|---|
| 2020/0022175 A1* | 1/2020 | Xiong | H04L 5/001 |
| 2021/0006367 A1* | 1/2021 | Zhou | H04W 72/0453 |
| 2021/0058197 A1 | 2/2021 | Gao | |

FOREIGN PATENT DOCUMENTS

| | | |
|---|---|---|
| CN | 107409321 A | 11/2017 |
| CN | 110351056 A | 10/2019 |
| WO | 2018/201488 A1 | 11/2018 |

OTHER PUBLICATIONS

Huawei, Hisilicon; "PUCCH Design for Short TTI;" 3GPP TSG RAN WG1 Meeting #84bis, R1-162110; Apr. 2016; pp. 1-4.
Intel Corporation; "Structure of 1~2 bits HARQ-ACK long PUCCH with TDM DMRS;" 3GPP TSG RAN WG1 Meeting #89, R1-1707392; May 2017; pp. 1-7.
Chinese language office action dated Dec. 31, 2024, issued in application No. CN 202080073938.X.

* cited by examiner

METHOD AND APPARATUS FOR DYNAMIC CROSS-CARRIER SCHEDULING IN MOBILE COMMUNICATIONS

CROSS REFERENCE TO RELATED PATENT APPLICATION(S)

The present disclosure claims the priority benefit of U.S. Provisional Patent Application No. 62/924,815, filed on 23 Oct. 2019, and U.S. Provisional Patent Application No. 63/039,513, filed 16 Jun. 2020. The contents of aforementioned applications are herein incorporated by reference in their entirety.

TECHNICAL FIELD

The present disclosure is generally related to mobile communications and, more particularly, to dynamic cross-carrier scheduling for latency enhancement and UCI transmission enhancement with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), hybrid automatic repeat request-acknowledgement (HARQ-ACK) information transmission is introduced to improve transmission reliability and robustness. The user equipment (UE) needs to report HARQ-ACK information for corresponding downlink receptions in a HARQ-ACK codebook. The HARQ-ACK codebook should be transmitted in a slot indicated by a value of a HARQ feedback timing indicator field in a corresponding downlink control information (DCI) format. The DCI format should also indicate the physical uplink control channel (PUCCH) resource scheduled for the HARQ-ACK information transmission. HARQ-ACK multiplexing can be used to facilitate HARQ-ACK information transmission. Multiple HARQ-ACK feedbacks corresponding to multiple physical downlink shared channel (PDSCH) transmissions may be accumulated, multiplexed and transmitted to the network apparatus at once. One PUCCH resource may be used to carry multiple HARQ-ACK feedbacks to be transmitted in the same slot.

The current framework of transmission of HARQ feedback bits is not suitable for URLLC. URLLC is introduced for emerging applications that demands high requirements on end-to-end latency and reliability. A general URLLC requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER. Accordingly, allowing only one PUCCH resource for HARQ feedback bits transmission in an uplink slot will add to transmission latency.

On the other hand, multi-link operation is introduced to increase system capacity and transmission efficiency of the communication systems. Multi-link operation can be implemented by carrier aggregation (CA) or dual connectivity (DC), where additional links are used to increase the amount of data that can be transferred to and from the UE. The UE can be configured with more than one radio links (e.g., component carriers) and can connect to more than one network nodes (e.g., serving cells). Under the framework of CA, cross-carrier scheduling is supported to improve transmission efficiency and reduce latency. Cross-carrier scheduling enables the UE to connect to different network nodes for receiving the downlink data on different carriers. Cross-carrier scheduling may also be used to balance the loads from traffic and scheduling across different component carriers. Without cross-carrier scheduling, the downlink scheduling assignments on physical downlink control channel (PDCCH) are only valid for the component carrier (CC) on which they were transmitted. With cross-carrier scheduling, the downlink scheduling assignments can be received on a CC other than the one on which PDCCH is received.

However, in current NR framework, cross-carrier scheduling for uplink control information (UCI) transmission (e.g., PUCCH) is not supported. In $3^{rd}$ Generation Partnership Project (3GPP) Release-16, PUCCH carrier is semi-statically configured to a single cell within a PUCCH cell group. In a time division duplex (TDD) system, the uplink/downlink TDD pattern is the bottleneck for the URLLC latency. TDD allows uplink and downlink to use the entire frequency spectrum, but in different time slots. Time is divided up into short slots and some are designated for uplink while others are designated for downlink. This approach enables asymmetric traffic and time-varying uplink and downlink demands. However, since PUCCH can only be scheduled in uplink slots, in an event that TDD pattern allocate more slots as downlink slots, the duration between uplink slots will be drawn too long and cause long latency. The worst case PUCCH alignment delay is dominated by the length of downlink and uplink and may be prohibitive to apply URLLC retransmission. Therefore, there is a need to introduce cross-carrier scheduling on PUCCH transmission and enhance UCI transmission for URLLC.

Accordingly, how to reduce alignment delay/latency and enhance reliability is an important issue for URLLC applications in the newly developed wireless communication network. Therefore, there is a need to provide proper cross-carrier scheduling mechanisms and UCI transmission enhancement for better performance when URLLC is supported.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to dynamic cross-carrier scheduling for latency enhancement and UCI transmission enhancement with respect to user equipment and network apparatus in mobile communications.

In one aspect, a method may involve an apparatus receiving a PDCCH on a first CC. The method may also involve the apparatus receiving a PDSCH on the first CC scheduled by the PDCCH. The method may further involve the apparatus determining a second CC to transmit a PUCCH according to a configuration of dynamic switching of CC. The method may further involve the apparatus transmitting the PUCCH corresponding to the PDSCH on the second CC scheduled by the PDCCH.

In one aspect, a method may involve an apparatus receiving a configuration configuring a plurality of SR resources over a plurality of CCs. The method may also involve the apparatus initiating an SR procedure. The method may further involve the apparatus determining one SR resource from the plurality of SR resources over the plurality of CCs to transmit an SR. The method may further involve the apparatus transmitting the SR on the determined SR resource.

In one aspect, a method may involve an apparatus determining a PUCCH format to transmit HARQ-ACK information. The method may also involve the apparatus using a length of two or three orthogonal frequency division multiplexing (OFDM) symbols to transmit the PUCCH format. The method may further involve the apparatus starting the PUCCH format by at least one demodulation reference signal (DMRS) symbol. The method may further involve the apparatus transmitting the PUCCH format. The PUCCH format may comprise at least one of a PUCCH format 1, a PUCCH format 3 and a PUCCH format 4.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
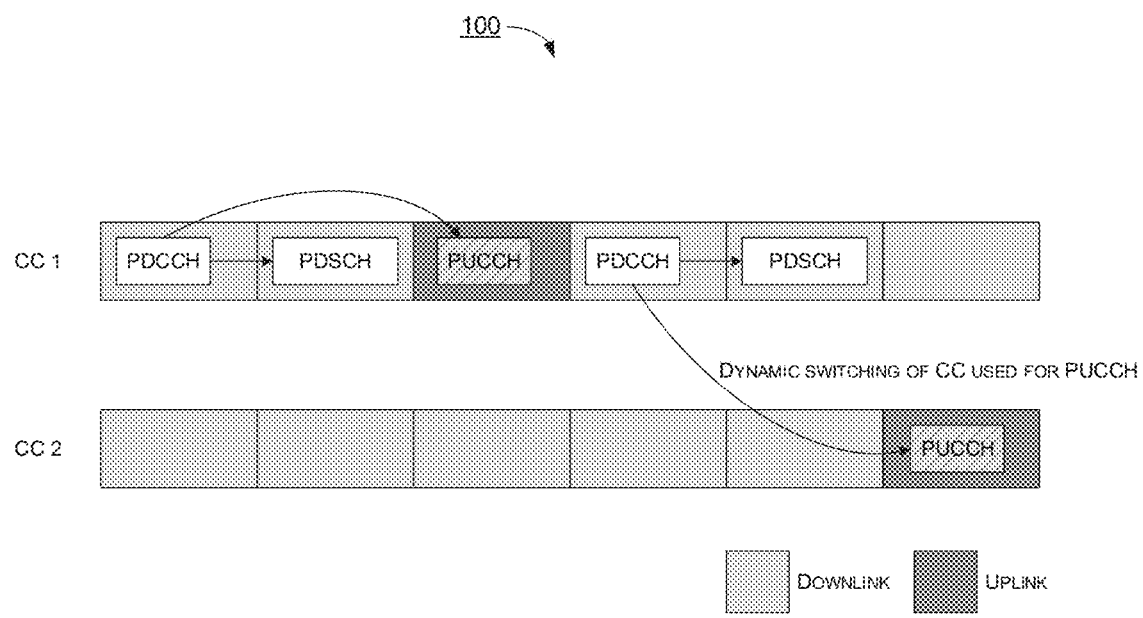
FIG. 1 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to dynamic cross-carrier scheduling for latency enhancement with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In current NR framework, cross-carrier scheduling for UCI transmission (e.g., PUCCH) is not supported. In 3GPP Release-16, PUCCH carrier is semi-statically configured to a single cell within a PUCCH cell group. In a TDD system, the uplink/downlink TDD pattern is the bottleneck for the URLLC latency. TDD allows uplink and downlink to use the entire frequency spectrum, but in different time slots. Time is divided up into short slots and some are designated for uplink while others are designated for downlink. This approach enables asymmetric traffic and time-varying uplink and downlink demands. However, since PUCCH can only be scheduled in uplink slots, in an event that TDD pattern allocate more slots as downlink slots, the duration between uplink slots will be drawn too long and cause long latency. The worst case PUCCH alignment delay is dominated by the length of downlink and uplink and may be prohibitive to apply URLLC retransmission. Therefore, there is a need to introduce cross-carrier scheduling on PUCCH transmission and enhance UCI transmission for URLLC.

In view of the above, the present disclosure proposes a number of schemes pertaining to dynamic cross-carrier scheduling for latency enhancement and UCI transmission enhancement with respect to the UE and the network apparatus. According to the schemes of the present disclosure, a CA system of TDD carriers with an appropriate time offset between uplink slots on different CC's is supported. The UE can be configured with dynamic cross-carrier scheduling for PUCCH. Dynamic switching of CC used for PUCCH can help to reduce the latency for CA with two or multiple carriers having different TDD patterns. In addition, dynamic cross-carrier scheduling for PDSCH and/or PUSCH may also be configured to the UE. Furthermore, configuring SR with an SR resource on each CC within a cell a group may be supported. The UE may be configured with a plurality of SR resources over a plurality of CCs. On the other hand, enhancement on PUCCH format may further be introduced. The current PUCCH format 1, 3 and 4 may be re-designed to enhance the reliability and reduce the latency. Accordingly, by applying the schemes of the present disclosure, the performance of UCI transmission can be improved to reduce alignment delay/latency. Applications with URLLC requirements can benefit from the enhancements achieved by the implementations of the present disclosure.

FIG. 1 illustrates an example scenario 100 under schemes in accordance with implementations of the present disclosure. Scenario 100 involves a UE and a plurality of network nodes, which may be a part of a wireless communication network (e.g., an LTE network, a 5G network, an NR network, an IoT network or an NB-IoT network). Scenario 100 illustrates an example of dynamic cross-carrier scheduling for PUCCH. The UE may be configured with a plurality of CCs such as a first CC (e.g., CC 1) and a second CC (e.g., CC 2). The first CC and the second CC may have different TDD patterns for uplink/downlink slots. For example, the ration of downlink slot to uplink slot is 3:1 for CC 1 and 5:1 for CC 2. To reduce the alignment delay, the UE may be configured with dynamic switching of CC used for PUCCH.

Specifically, the UE may receive a PDCCH on the first CC. The PDCCH may schedule a PDSCH on the first CC. The UE may receive the PDSCH on the first CC scheduled by the PDCCH. Then, the UE needs to transmit the HARQ-ACK information corresponding to the PDSCH to the network node. Therefore, the PDCCH may further schedule a PUCCH for transmitting the HARQ-ACK information. To reduce latency, the PUCCH may be scheduled on a different CC. For example, the closest uplink slot for PUCCH transmission is allocated on the second CC. Thus, the UE may determine the second CC to transmit the PUCCH according to a configuration of dynamic switching of CC. Then, the UE may transmit the PUCCH corresponding to the PDSCH on the second CC scheduled by the PDCCH.

Some methods are provided for configuring dynamically selectable multiple choices of CC to use for PUCCH carrying HARQ-ACK information. For example, within a cell group, the CC to use for PUCCH should be dynamically selectable. The configuration for dynamic switching of CC may comprise a plurality of CCs configured to be used to transmit the PUCCH. Some restrictions on the number of selectable CC could apply. For example, only a pre-determined number of CCs (e.g., K=2 CCs) could be used to transmit the PUCCH. The UE may receive a configuration (e.g., radio resource control (RRC) configuration) configuring a plurality of CCs within a cell group that can be used to transmit the PUCCH. For example, appointing multiple serving cells within cell group to use for PUCCH may be supported (e.g., per PDSCH-ServingCell configuration). PUCCH-Cell field of PDSCH-ServingCellConfig should be allowed to list at most K elements of ServCellIndex. The content of the HARQ-ACK codebook carried by the PUCCH is independent from the CC selected for PUCCH transmission (e.g., CC 2).

The configuration for dynamic switching of CC may comprise a physical layer signaling. In one example, the configuration may comprise a data field used to select a CC from a plurality of different CCs to transmit the PUCCH. A new field may be introduced for explicit selection between K different CCs. In another example, the configuration may comprise an indication indicating an earliest uplink slot/sub-slot over a plurality of CCs. The earliest uplink slot/sub-slot on any CC may be selected. This behaviour may be configured with a HARQ procedure, or signalled by a special K1 index/value, or any other affordable way to signal 1 bit. In a further example, the configuration may comprise a data field used to select a CC and a slot/sub-slot. The CC and slot/sub-slot may be selected by the same field K1 which counts the slot/sub-slot boundaries across all CCs that can be selected for PUCCH transmission. Optionally, the slot/sub-slot count can be increased in an event that the slot/sub-slot following the boundary contains uplink symbols or flexible downlink/uplink symbols. The reference point for K1 offset can be the end of PDSCH or the end of N1 UE processing timeline.

There may be some constraints/regulations for the configuration. For example, different CCs may employ different numerologies or slot/sub-slot partitioning configurations. The number of CCs that can be used for PUCCH transmission needs not be constrained, although will affect the range of offsets that K1 field can handle. This whole feature (e.g., dynamic cross-carrier scheduling for PUCCH) could be enabled per HARQ procedure. Optionally, forming HARQ cell groups within the same cell group may be supported to allow for simultaneous construction of multiple HARQ-ACK codebooks. Then the previously proposed behaviour can be applicable to the HARQ cell groups instead of the cell groups. A physical layer signalling method may be introduced for the selection of the HARQ cell group.

In some implementations, dynamic cross-carrier scheduling for PUCCH with dynamic indication of the carrier carrying the PUCCH can be configured based on different radio network temporary identity (RNTI) (e.g., Cell-RNTI (C-RNTI), modulation and coding scheme-C-RNTI (MCS-C-RNTI), etc.), search space, or different DCI format/size. In another implementation, any other DCI field could be used to indicate the carrier component carrying PUCCH. In another implementation, a UE-specific DCI or a group common-DCI (GC-DCI) could be used to signal the carrier component carrying PUCCH.

In some implementations, some restrictions may be applied on dynamic cross-carrier scheduling for PUCCH. For example, a group of carriers carrying dynamically scheduled PUCCH may be contained within a PUCCH group or a cell group. The carriers for dynamic cross-carrier scheduling are across PUCCH groups and/or cell groups. A group (e.g., a PUCCH group, a cell-group, or a newly defined group of cells) of M carriers may have a mapping to a specific group of N carriers capable of carrying PUCCH. Dynamic cross-carrier scheduling for PUCCH is allowed between the M carriers to the N associated carriers capable of carrying the PUCCH. If a carrier indicator field is added to the DCI for PUCCH carrier indication, then the bit-field size may be determined by ceiling ($\log_2(N)$). In another implementation, each carrier in the group of M carriers may be configured with the associated group of N carriers capable of carrying the dynamic PUCCH. The group of N carriers may be a sub-group of the group of M carriers. Alternatively, the group of M carriers and the group of N carriers may overlap or may be totally disjoint. The group (e.g., a PUCCH group, a cell-group, or a newly defined group of cells) of M carriers may be configured by a network node (e.g., gNB) with semi-static or dynamic cross-carrier scheduling for PUCCH. Such restriction to sub-set of carriers above may also be applied to any method of cross-carrier indication (e.g., explicit indication such as DCI or search space, or implicit indication such as earliest available PUCCH).

In some implementations, UE capability report may be performed for dynamic cross-carrier scheduling for PUCCH. Specifically, the support of dynamic cross-carrier scheduling for PUCCH may be defined as a UE capability. The UE may be configured to report to the network node in an event that it can support dynamic cross-carrier scheduling for PUCCH. The UE may report the number or the maximum number of groups (e.g., PUCCH groups, cell-groups, or newly defined groups of cells) on which it can support dynamic cross-carrier scheduling for PUCCH. The UE may also report its capability for each group (e.g., a PUCCH group, a cell-group, or a newly defined group of cells) in an event that it can support dynamic cross-carrier scheduling for PUCCH. In another implementation, the UE may report the number of PUCCH groups on which it can support dynamic cross-carrier scheduling. In another implementation, the UE may report the number of PUCCH groups on which it can support semi-static cross-carrier scheduling and/or dynamic cross-carrier scheduling. In another implementation, a specified number of CCs for dynamic cross-carrier scheduling may be defined and the UE reports which number it can support. Furthermore, the UE may report for each group (e.g., a PUCCH group, a cell-group, or a newly defined group of cells) the number N of carriers on which it can support the dynamic cross-carrier scheduling for PUCCH. The UE may report for each carrier if it can support the dynamic cross-carrier scheduling for PUCCH. The UE may report the total number or the maximum number of carriers on which it can support the dynamic cross-carrier scheduling for PUCCH.

In some implementations, the priority (PRI) field and/or other fields like K1 may be padded with zero for DCI size alignment to allow for dynamic selection of the carrier carrying the PUCCH without changing the DCI size (e.g., similar to the case of different priorities). This specific DCI size alignment may be enabled when dynamic cross-carrier PUCCH is enabled. Multiple high priority HARQ-ACK codebooks may be constructed simultaneously in a PUCCH group or cell group when dynamic cross-carrier transmission of PUCCH is enabled.

In some implementations, some restrictions may be applied on the configurations for dynamic cross-carrier scheduling for PUCCH. For example, the dynamic carrier selection for PUCCH transmission may be restricted to at least one of PUCCH carrying HARQ-ACK, PUCCH carrying high priority HARQ-ACK codebook, high priority SR, and high priority CSI. Semi-static PUCCH may be configured for low priority HARQ. Dynamic PUCCH selection may be configured for high priority HARQ. In another example, a group (e.g., a PUCCH group, a cell-group, or a newly defined group of cells) may be configured with dynamic carrier selection for PUCCH for high priority HARQ-ACK. In another example, a group (e.g., a PUCCH group, a cell-group, or a newly defined group of cells) may be configured with static carrier selection for PUCCH for low priority HARQ-ACK. In another example, the support of dynamic carrier selection for PUCCH transmission may be restricted to carriers supporting sub-slot-based HARQ-ACK feedback procedure. In another example, the support of dynamic carrier selection for PUCCH transmission is not allowed for a group of carriers, a PUCCH group, or a cell group where some carriers support sub-slot-based HARQ-ACK feedback and some carriers support slot-based HARQ-ACK feedback. In another example, the dynamic carrier selection for PUCCH transmission may be allowed only for cross-carrier scheduling for carriers with the same numerology. In another example, the dynamic carrier selection for PUCCH transmission may be allowed only for some PUCCH formats (e.g. only for short PUCCH formats). In another example, when the dynamic carrier selection for PUCCH transmission is enabled, a default PUCCH carrier may be defined. The default PUCCH carrier may be used as a fall-back when there is collision between PUCCH and another high priority transmission. When the PUCCH scheduled with dynamic carrier selection collides with a high priority PUSCH, PUCCH and PUSCH are multiplexed in an event that PUCCH is carrying high priority HARQ/SR. When the PUCCH scheduled with dynamic carrier selection collides with a high priority PUSCH, PUCCH transmission fall-back to a default PUCCH carrier in an event that PUCCH is carrying low priority HARQ/SR. In another example, the dynamic carrier selection for PUCCH transmission may be allowed only for HARQ-ACK codebook type-1 or type-2.

In some implementations, in an event that a PUCCH transmission is dropped due to a collision, the network node may request the same PUCCH transmission on another specific carrier.

In addition, determination of PUCCH resources with dynamic carrier selection for PUCCH transmission may further be proposed. In combination with all the following proposals on K1, when dynamic carrier selection for PUCCH transmission using implicit or explicit indication of the carrier is supported between carriers with different numerology and/or uplink sub-slot partitioning (including slot based configuration), the UE processing time needed between the end of PDSCH reception (e.g., with sub-carrier spacing (SCS)u1) and start of PUCCH transmission (e.g., with SCS u2) may be determined by max(T1, T2). T1=N1_1×S1, N1_1 is the UE processing time in the single numerology with SCS u1, and S1 is the symbol duration of SCS u1. T2=N1_2×S2, N1_2 is the UE processing time in the single numerology with SCS u2, and S2 is the symbol duration of SCS u2. When the target carrier is selected implicitly by a rule, max(T1, T2) is evaluated independently per each hypothetical target carrier.

In some implementations, when dynamic carrier selection for PUCCH transmission using implicit or explicit indication of the carrier is supported between carriers with different numerology and/or uplink sub-slot partitioning (including slot based configuration), K1 may apply a common unit for the set of carriers allowed for cross-carrier scheduling. Conveniently, K1 could be the shortest configured sub-slot length amongst CCs expressed at the numerology of the highest SCS amongst CCs and configured or active bandwidth parts (BWPs). In another implementations, K1 may apply a flexible unit that is specific to each pair of carriers that may potentially participate in the cross-carrier scheduling and their roles. Conveniently, K1 could be evaluated by trying all hypothetical CCs for PUCCH and using a 2-D table that specifies the unit for K1 for each ordered pair of CCs (e.g., $1^{st}$ CC: PDCCH, $2^{nd}$ CC: PUCCH). In another implementations, K1 may apply the unit configured for the indicated target carrier for PUCCH.

Figure 2:
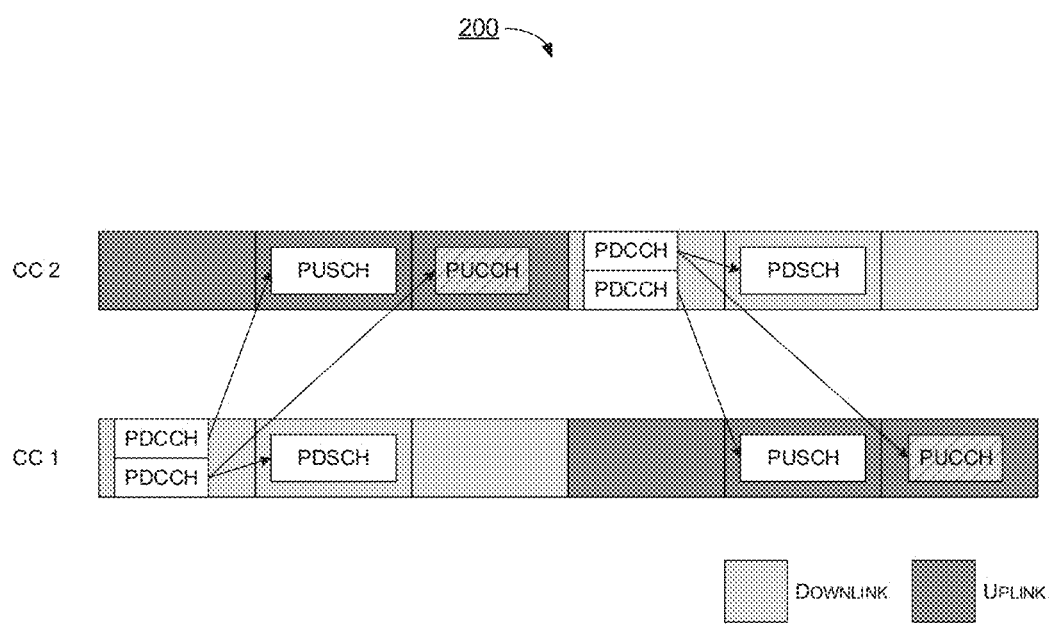
FIG. 2 is a diagram depicting an example scenario under schemes in accordance with implementations of the present disclosure.

In another aspect, for a TDD system, the worst case of PDSCH/PUSCH alignment delay is dominated by the length of downlink and uplink and may be inhibitive to apply URLLC retransmission. Therefore, to reduce the alignment delay, there is a need to deploy a CA system of TDD carriers with an appropriate time offset between uplink slots of different CCs and introduce dynamic cross-carrier scheduling for PDSCH/PUSCH. FIG. 2 illustrates an example scenario 200 under schemes in accordance with implementations of the present disclosure. Scenario 200 involves a UE and a plurality of network nodes, which may be a part of a wireless communication network (e.g., an LTE network, a 5G network, an NR network, an IoT network or an NB-IoT network). Scenario 200 illustrates an example of dynamic cross-carrier scheduling for PDSCH and/or PUSCH. The UE may be configured with a plurality of CCs such as a first CC (e.g., CC 1) and a second CC (e.g., CC 2). The first CC and the second CC may have different TDD patterns for uplink/downlink slots. For example, CC 1 and CC 2 may have opposite downlink/uplink slot distribution. To reduce the alignment delay, the UE may be configured with dynamic switching of CC used for PDSCH and/or PUSCH.

Specifically, the UE may receive a first PDCCH on the first CC for scheduling a PDSCH. The first PDCCH may schedule the PDSCH on the first CC. The UE may receive the PDSCH on the first CC scheduled by the first PDCCH. The UE may further receive a second PDCCH on the first CC for scheduling a PUSCH. To reduce latency, the PUSCH may be scheduled on a different CC with a closest uplink slot (e.g., the second CC). Thus, the UE may determine the second CC to transmit the PUSCH according to the configuration of dynamic switching of CC. Then, the UE may transmit the PUSCH on the second CC scheduled by the second PDCCH.

Similarly, the second CC may also be able to schedule a PUSCH/PUCCH on a different CC (e.g., the first CC), and multiple carriers may be monitored for PDCCH. As shown in FIG. 2, the UE may receive a first PDCCH on second CC for scheduling a PDSCH. The first PDCCH may schedule the PDSCH on the second CC. The UE may receive the PDSCH on the second CC scheduled by the first PDCCH. The UE may further receive a second PDCCH on the second CC for scheduling a PUSCH. To reduce latency, the PUSCH may be scheduled on a different CC with a closest uplink slot (e.g., the first CC). Thus, the UE may determine the first CC to transmit the PUSCH according to the configuration of dynamic switching of CC. Then, the UE may transmit the PUSCH on the first CC scheduled by the second PDCCH.

In some implementations, dynamic cross-carrier scheduling may also be applied on PDSCH. The UE may receive a PDCCH on the first CC for scheduling a PDSCH. The first PDCCH may schedule the PDSCH on a different CC (e.g., the second CC). The UE may determine to receive the PDSCH on the second CC according to the configuration of dynamic switching of CC. The UE may receive the PDSCH on the second CC scheduled by the PDCCH.

Some methods are provided for configuring dynamically selectable multiple choices of CC on which scheduling information for PDSCH/PUSCH is transmitted. For example, some restrictions on the number of selectable CC could apply. In another example, this behaviour may be enabled only when a physical indication of URLLC or high-priority traffic is detected from PDSCH or the resources allocated for PDSCH. In another example, the PDCCH monitoring may be restricted to a single carrier per monitoring occasion or set of monitoring occasions over CCs. When multiple CCs contain downlink and monitoring occasions, then some priority rules need to be used (e.g. a primary cell within a cell group may have higher priority). The multiple CCs may be configured with different numerologies.

Figure 3:
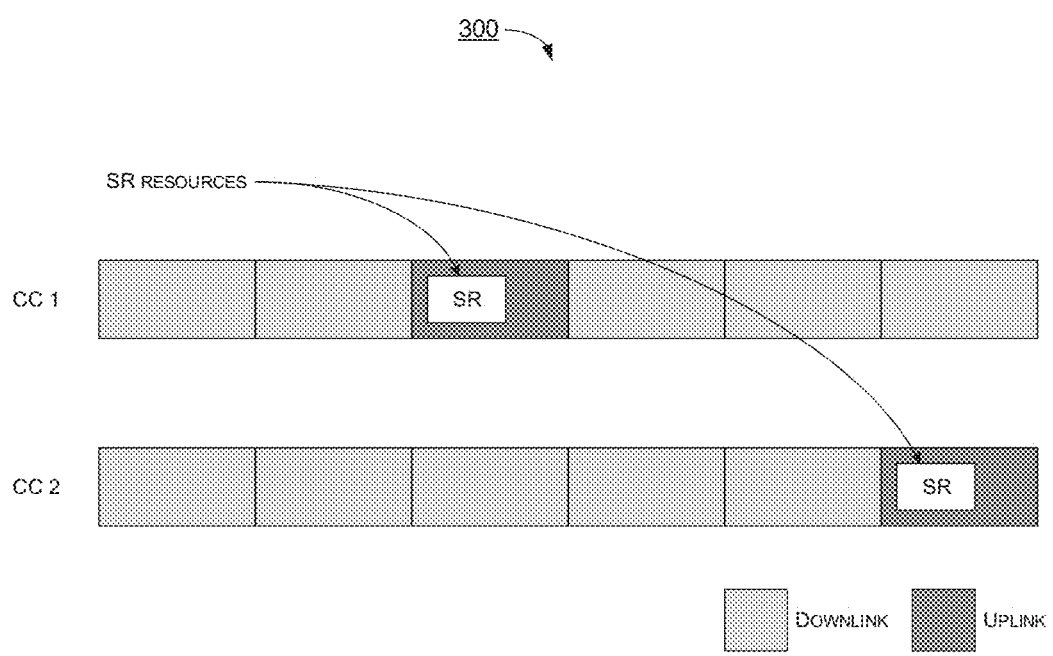
FIG. 3 is a diagram depicting an example scenario under schemes in accordance with implementations of the present disclosure.

In another aspect, for a TDD system, the worst case of SR alignment delay is dominated by the length of downlink and uplink and may be inhibitive to apply URLLC retransmission. Therefore, to reduce the alignment delay, there is a need to deploy a CA system of TDD carriers with an appropriate time offset between CCs, and support configuring SR with an SR resource on each CC within a cell group. FIG. 3 illustrates an example scenario 300 under schemes in accordance with implementations of the present disclosure. Scenario 300 involves a UE and a plurality of network nodes, which may be a part of a wireless communication network (e.g., an LTE network, a 5G network, an NR network, an IoT network or an NB-IoT network). Scenario 300 illustrates an example of multiple SR resources configured on multiple CCs. The UE may be configured with a plurality of CCs such as a first CC (e.g., CC 1) and a second CC (e.g., CC 2). The first CC and the second CC may have different TDD patterns for uplink/downlink slots. For example, the ration of downlink slot to uplink slot is 3:1 for CC 1 and 5:1 for CC 2. To reduce the alignment delay, the UE may be configured with multiple SR resources distributed on each CC. For example, at least one SR resource may be configured on each CC within a cell group.

Specifically, the UE may receive a configuration configuring a plurality of SR resources over a plurality of CCs. The configuration may comprises a logical channel configuration, a scheduling request configuration, a scheduling request resource configuration, a PUCCH configuration, or a PUCCH resource configuration. When the UE try to initiate an SR procedure, the UE may determine one SR resource from the plurality of SR resources over the plurality of CCs to transmit an SR. For example, the UE may determine an earliest SR resource over the plurality of CCs to transmit the SR. Then, the UE may transmit the SR on the determined SR resource. An SR may have multiple SR resources (e.g., PUCCH, periodicity and offset) operated with a common prohibition timer. The SR resources assigned to the same SR may be on different CCs and uplink BWPs within a cell group.

Figure 4:
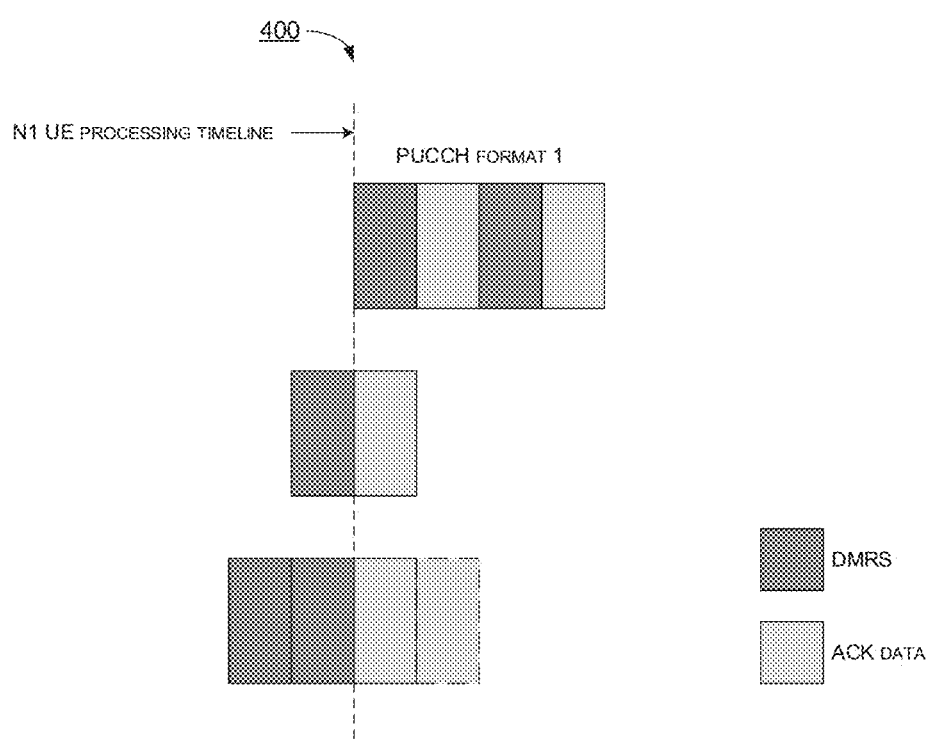
FIG. 4 is a diagram depicting an example scenario under schemes in accordance with implementations of the present disclosure.

To further enhance PUCCH transmission for reducing delay and/or improving reliability of HARQ feedback, some enhancements on PUCCH format may further be introduced. FIG. 4 illustrates an example scenario 400 under schemes in accordance with implementations of the present disclosure. Scenario 400 involves a UE and a plurality of network nodes, which may be a part of a wireless communication network (e.g., an LTE network, a 5G network, an NR network, an IoT network or an NB-IoT network). The legacy PUCCH format 1 in 3GPP Release-15 comprises 4 symbols and starts after N1 UE processing timeline. Therefore, the PUCCH transmission latency comprises N1+alignment+PUCCH duration. To reduce such latency, some enhancements on PUCCH formats are proposed. The UE may be configured to support 2, 3, 4, etc. symbol length formats. The length of the PUCCH format may be determined by a length of M+N where N DMRS symbols may be followed by an M long mix of ACK and DMRS symbols.

Specifically, the UE may be configured to determine a PUCCH format to transmit the HARQ-ACK information. The UE may use a length of two or three OFDM symbols to transmit the PUCCH format. For example, the PUCCH format may comprise 2 or 3 symbols. Thus, the PUCCH duration may be reduced to improve latency. Furthermore, the UE may shuffle the PUCCH symbols by starting the PUCCH format by at least one (e.g., one or more) DMRS symbol. The UE may arrange the PUCCH format by a plurality of DMRS symbols followed by at least one HARQ-ACK information symbol. For example, the PUCCH format may start by one DMRS symbol followed with one HARQ-ACK data symbol. In another example, the PUCCH format may start by two DMRS symbols followed with one HARQ-ACK data symbol. Then, the UE may transmit the PUCCH format with the enhanced format. The PUCCH format may comprise at least one of a PUCCH format 1, a PUCCH format 3 and a PUCCH format 4.

On the other hand, to further reduce latency, the UE may be configured to support DMRS overlapping with N1 UE processing timeline. Normally, PUCCH transmission may only be scheduled after the end of the UE processing timeline N1, measured from the last symbol of the PDSCH transmission. However, with the new format and in the new proposal, as soon as the PUCCH resource have been identified transmission of the pre-computed DMRS symbol(s) can start, (possibly overlapping with the decoding of the PDSCH transmission). The identification of the PUCCH resource implies that a later DCI scheduling PUCCH cannot override the current transmission. Thus, the UE may overlap at least one DMRS symbol (e.g., 1 or 2 DMRS symbols) with the N1 UE processing timeline. In other words, the UE may transmit the DMRS symbol(s) during the N1 UE processing time to save time. Part of the N1 UE processing time may be simultaneously used to transmit the DMRS symbol(s). The UE may start to transmit the HARQ-ACK data right after the N1 UE processing time. Thus, the total PUCCH transmission latency (e.g., N1+alignment+PUCCH duration) may be reduced.

In some implementations, the UE may be configured to support 2 cyclic-delay diversity (CDD) over two transmit antennae. The UE may transmit the PUCCH format by CDD over two transmit antennae. The amount of cyclic delay is predefined or configured, hence it can be applied in a fashion non-transparent to the network node. In another implementation, to support frequency hopping using the above new PUCCH format, it is proposed that the association between DMRS and UCI symbols transmitted on the same frequencies can be made over non-contiguous symbols. The UE may be configured to support non-adjacent-in-time DMRS and ACK symbols occurring on the same frequency hop. The UE may transmit the DMRS symbol and HARQ-ACK information over non-contiguous OFDM symbols.

Illustrative Implementations

Figure 5:
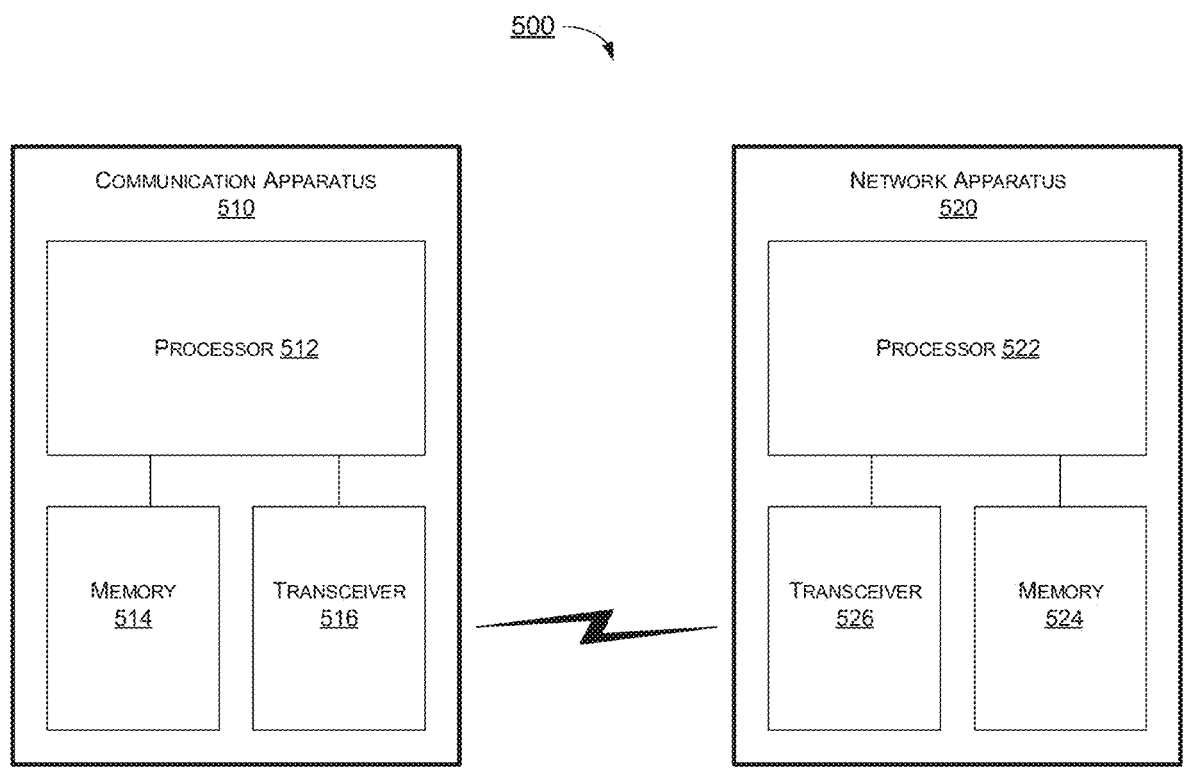
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to dynamic cross-carrier scheduling for latency enhancement and UCI transmission enhancement with respect to user equipment and network apparatus in wireless communications, including scenarios/schemes described above as well as processes 600, 700 and 800 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 510 may include at least some of those components shown in FIG. 5 such as a processor 512, for example. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a base station, a small cell, a router or a gateway. For instance, network apparatus 520 may be implemented in an eNodeB in an LTE, LTE-Advanced or LTE-Advanced Pro network or in a gNB in a 5G, NR, IoT, NB-IoT or IIoT network. Alternatively, network apparatus 520 may be implemented in the form of one or more IC chips such as, for example and without limitation, one or more single-core processors, one or more multi-core processors, or one or more RISC or CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including power consumption reduction in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein.

Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, processor 512 may receive, via transceiver 516, a PDCCH on the first CC. The PDCCH may schedule a PDSCH on the first CC. Processor 512 may receive, via transceiver 516, the PDSCH on the first CC scheduled by the PDCCH. Then, processor 512 needs to transmit the HARQ-ACK information corresponding to the PDSCH to the network node. Therefore, the PDCCH may further schedule a PUCCH for transmitting the HARQ-ACK information. To reduce latency, the PUCCH may be scheduled on a different CC. For example, the closest uplink slot for PUCCH transmission is allocated on the second CC. Thus, processor 512 may determine the second CC to transmit the PUCCH according to a configuration of dynamic switching of CC. Then, processor 512 may transmit, via transceiver 516, the PUCCH corresponding to the PDSCH on the second CC scheduled by the PDCCH.

In some implementations, processor 512 may receive, via transceiver 516, a configuration (e.g., RRC configuration) configuring a plurality of CCs within a cell group that can be used to transmit the PUCCH. Processor 512 may receive the configuration for dynamic switching of CC via a physical layer signaling.

In some implementations, processor 512 may be configured to report to network apparatus 520 in an event that it can support dynamic cross-carrier scheduling for PUCCH. Processor 512 may report the number or the maximum number of groups (e.g., PUCCH groups, cell-groups, or newly defined groups of cells) on which it can support dynamic cross-carrier scheduling for PUCCH. Processor 512 may also report its capability for each group (e.g., a PUCCH group, a cell-group, or a newly defined group of cells) in an event that it can support dynamic cross-carrier scheduling for PUCCH.

In some implementations, processor 512 may report the number of PUCCH groups on which it can support dynamic cross-carrier scheduling. In another implementation, processor 512 may report the number of PUCCH groups on which it can support semi-static cross-carrier scheduling and/or dynamic cross-carrier scheduling. In another implementation, a specified number of CCs for dynamic cross-carrier scheduling may be defined and Processor 512 reports which number it can support.

In some implementations, processor 512 may report for each group (e.g., a PUCCH group, a cell-group, or a newly defined group of cells) the number N of carriers on which it can support the dynamic cross-carrier scheduling for PUCCH. Processor 512 may report for each carrier if it can support the dynamic cross-carrier scheduling for PUCCH. Processor 512 may report the total number or the maximum number of carriers on which it can support the dynamic cross-carrier scheduling for PUCCH.

In some implementations, processor 512 may receive, via transceiver 516, a first PDCCH on the first CC for scheduling a PDSCH. The first PDCCH may schedule the PDSCH on the first CC. Processor 512 may receive, via transceiver 516, the PDSCH on the first CC scheduled by the first PDCCH. Processor 512 may further receive, via transceiver 516, a second PDCCH on the first CC for scheduling a PUSCH. To reduce latency, the PUSCH may be scheduled on a different CC with a closest uplink slot (e.g., the second CC). Thus, processor 512 may determine the second CC to transmit the PUSCH according to the configuration of dynamic switching of CC. Then, processor 512 may transmit, via transceiver 516, the PUSCH on the second CC scheduled by the second PDCCH.

In some implementations, processor 512 may receive, via transceiver 516, a first PDCCH on second CC for scheduling a PDSCH. The first PDCCH may schedule the PDSCH on the second CC. Processor 512 may receive, via transceiver 516, the PDSCH on the second CC scheduled by the first PDCCH. Processor 512 may further receive, via transceiver 516, a second PDCCH on the second CC for scheduling a PUSCH. To reduce latency, the PUSCH may be scheduled on a different CC with a closest uplink slot (e.g., the first CC). Thus, processor 512 may determine the first CC to transmit the PUSCH according to the configuration of dynamic switching of CC. Then, processor 512 may transmit, via transceiver 516, the PUSCH on the first CC scheduled by the second PDCCH.

In some implementations, processor 512 may receive, via transceiver 516, a PDCCH on the first CC for scheduling a PDSCH. The first PDCCH may schedule the PDSCH on a different CC (e.g., the second CC). Processor 512 may determine to receive the PDSCH on the second CC according to the configuration of dynamic switching of CC. Processor 512 may receive, via transceiver 516, the PDSCH on the second CC scheduled by the PDCCH.

In some implementations, processor 512 may receive, via transceiver 516, a configuration configuring a plurality of SR resources over a plurality of CCs. When processor 512 try to initiate an SR procedure, processor 512 may determine one SR resource from the plurality of SR resources over the plurality of CCs to transmit an SR. For example, processor 512 may determine an earliest SR resource over the plurality of CCs to transmit the SR. Then, processor 512 may transmit, via transceiver 516, the SR on the determined SR resource.

In some implementations, processor 512 may be configured to determine a PUCCH format to transmit the HARQ-ACK information. Processor 512 may use a length of two or three OFDM symbols to transmit the PUCCH format. Furthermore, processor 512 may shuffle the PUCCH symbols by starting the PUCCH format by at least one (e.g., one or more) DMRS symbol. Processor 512 may arrange the PUCCH format by a plurality of DMRS symbols followed by at least one HARQ-ACK information symbol. Then, processor 512 may transmit, via transceiver 516, the PUCCH format with the enhanced format. The PUCCH format may comprise at least one of a PUCCH format 1, a PUCCH format 3 and a PUCCH format 4.

In some implementations, processor 512 may overlap at least one DMRS symbol (e.g., 1 or 2 DMRS symbols) with the N1 processing timeline. In other words, processor 512 may transmit the DMRS symbol(s) during the N1 processing time to save time. Part of the N1 processing time may be simultaneously used to transmit the DMRS symbol(s). Processor 512 may start to transmit, via transceiver 516, the HARQ-ACK data right after the N1 processing time.

Illustrative Processes

Figure 6:
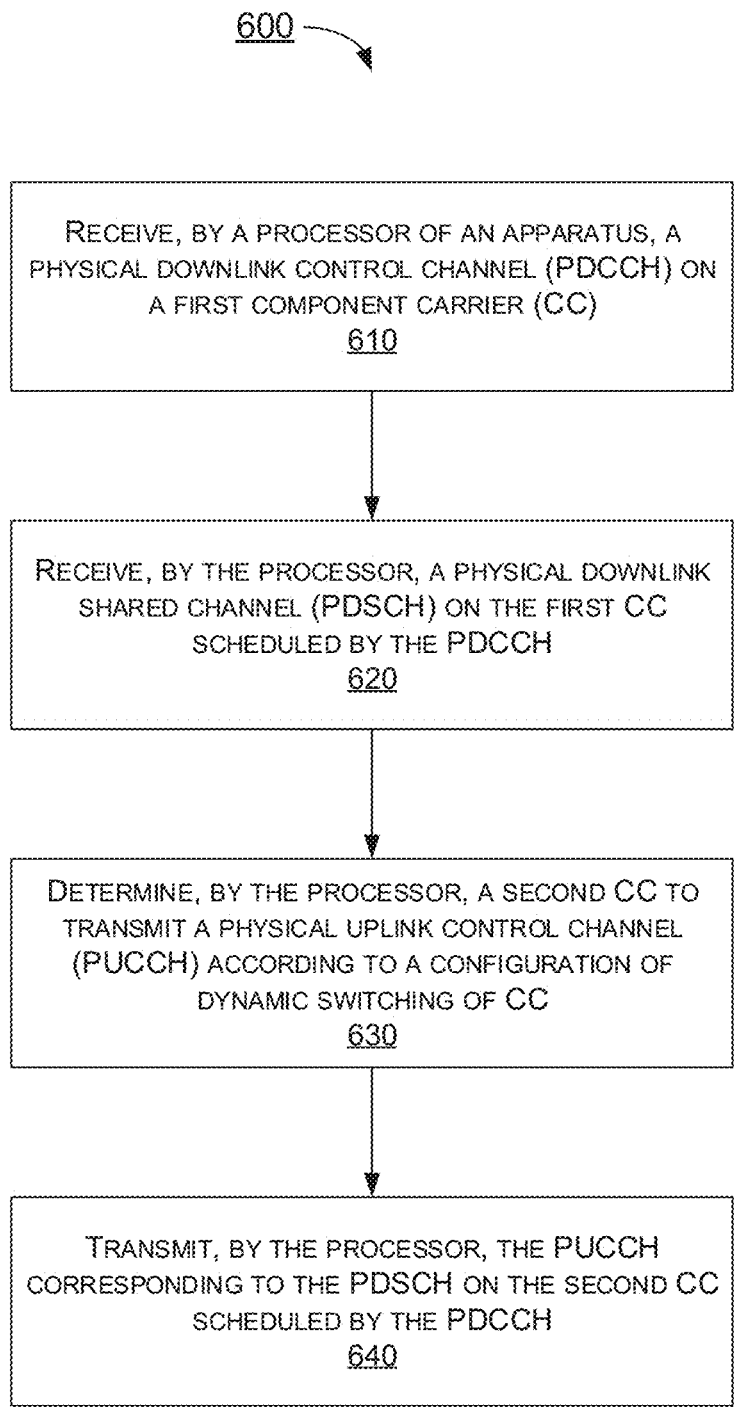
FIG. 6 is a flowchart of an example process in accordance with an implementation of the present disclosure.

FIG. 6 illustrates an example process 600 in accordance with an implementation of the present disclosure. Process 600 may be an example implementation of schemes described above, whether partially or completely, with respect to dynamic cross-carrier scheduling for latency enhancement with the present disclosure. Process 600 may represent an aspect of implementation of features of communication apparatus 510. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve processor 512 of apparatus 510 receiving a PDCCH on a first CC. Process 600 may proceed from 610 to 620.

At 620, process 600 may involve processor 512 receiving a PDSCH on the first CC scheduled by the PDCCH. Process 600 may proceed from 620 to 630.

At 630, process 600 may involve processor 512 determining a second CC to transmit a PUCCH according to a configuration of dynamic switching of CC. Process 600 may proceed from 630 to 640.

At 640, process 600 may involve processor 512 transmitting the PUCCH corresponding to the PDSCH on the second CC scheduled by the PDCCH.

In some implementations, the configuration may comprise a plurality of CCs configured to be used to transmit the PUCCH.

In some implementations, process 600 may involve processor 512 receiving a configuration configuring a plurality of CCs within a cell group that can be used to transmit the PUCCH.

In some implementations, a content carried by the PUCCH is independent from the determined second CC.

In some implementations, the configuration may comprise a physical layer signaling.

In some implementations, the configuration may comprise a data field used to select a CC from a plurality of different CCs to transmit the PUCCH.

In some implementations, the configuration may comprise an indication indicating an earliest uplink sub-slot over a plurality of CCs.

In some implementations, the configuration may comprise a data field used to select a CC and a sub-slot.

In some implementations, the first CC and the second CC may comprise different numerologies or sub-slot partitioning configurations.

In some implementations, process 600 may involve processor 512 determining the second CC to transmit a PUSCH according to the configuration of dynamic switching of CC. Process 600 may further involve processor 512 transmitting the PUSCH on the second CC scheduled by the PDCCH.

In some implementations, process 600 may involve processor 512 receiving a PDCCH on second CC. Process 600 may also involve processor 512 receiving a PDSCH on the second CC scheduled by the PDCCH. Process 600 may further involve processor 512 determining the first CC to transmit the PUCCH according to the configuration of dynamic switching of CC. Process 600 may further involve processor 512 transmitting the PUCCH corresponding to the PDSCH on the first CC scheduled by the PDCCH.

In some implementations, process 600 may involve processor 512 determining to receive a PDSCH on the second CC according to the configuration of dynamic switching of CC. Process 600 may further involve processor 512 receiving the PDSCH on the second CC scheduled by the PDCCH.

Figure 7:
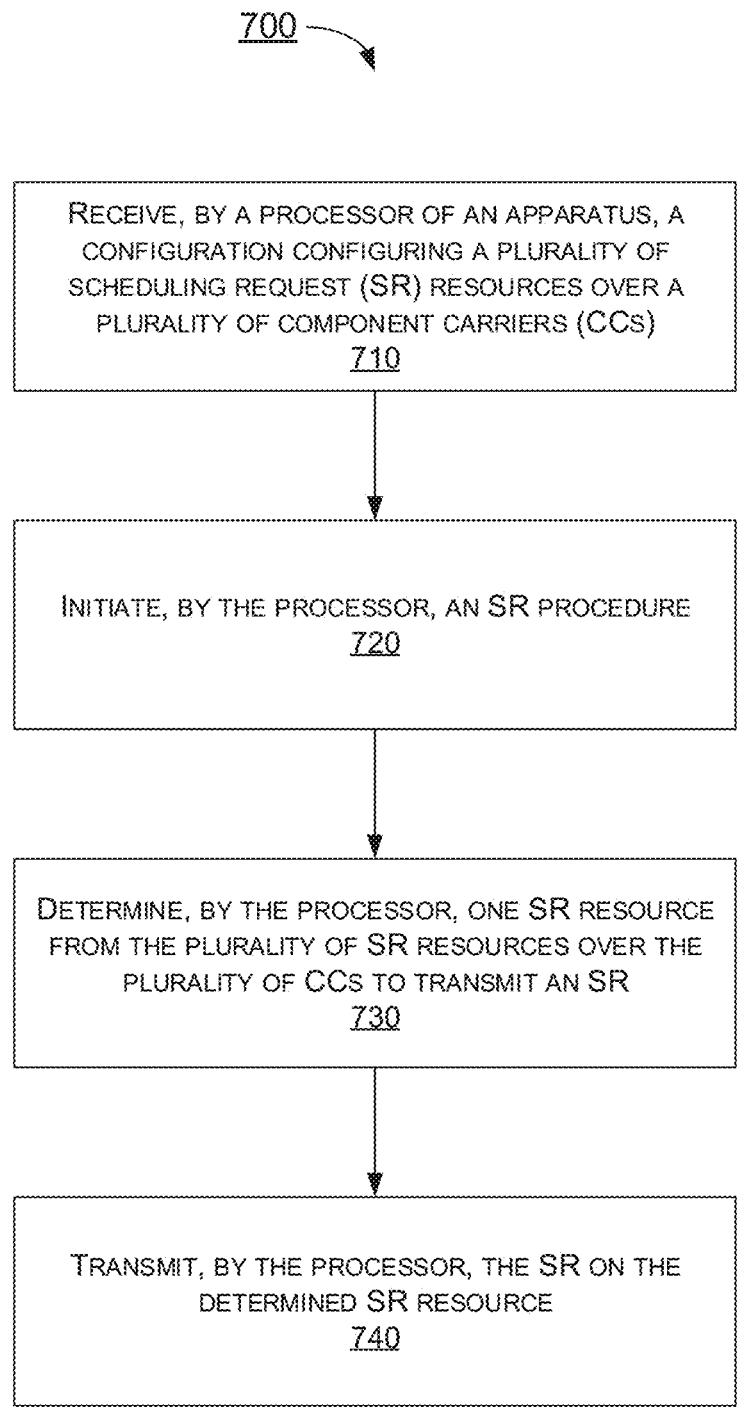
FIG. 7 is a flowchart of an example process in accordance with an implementation of the present disclosure.

FIG. 7 illustrates an example process 700 in accordance with an implementation of the present disclosure. Process 700 may be an example implementation of schemes described above, whether partially or completely, with respect to UCI transmission enhancement with the present disclosure. Process 700 may represent an aspect of implementation of features of communication apparatus 510. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 510 or any suitable UE or machine type devices. Solely for illustrative purposes and without limitation, process 700 is described below in the context of communication apparatus 510. Process 700 may begin at block 710.

At 710, process 700 may involve processor 512 of apparatus 510 receiving a configuration configuring a plurality of SR resources over a plurality of CCs. Process 700 may proceed from 710 to 720.

At 720, process 700 may involve processor 512 initiating an SR procedure. Process 700 may proceed from 720 to 730.

At 730, process 700 may involve processor 512 determining one SR resource from the plurality of SR resources over the plurality of CCs to transmit an SR. Process 700 may proceed from 730 to 740.

At 740, process 700 may involve processor 512 transmitting the SR on the determined SR resource.

In some implementations, process 700 may involve processor 512 determining an earliest SR resource over the plurality of CCs to transmit the SR.

In some implementations, the configuration may comprise at least one SR resource on each CC within a cell group.

Figure 8:
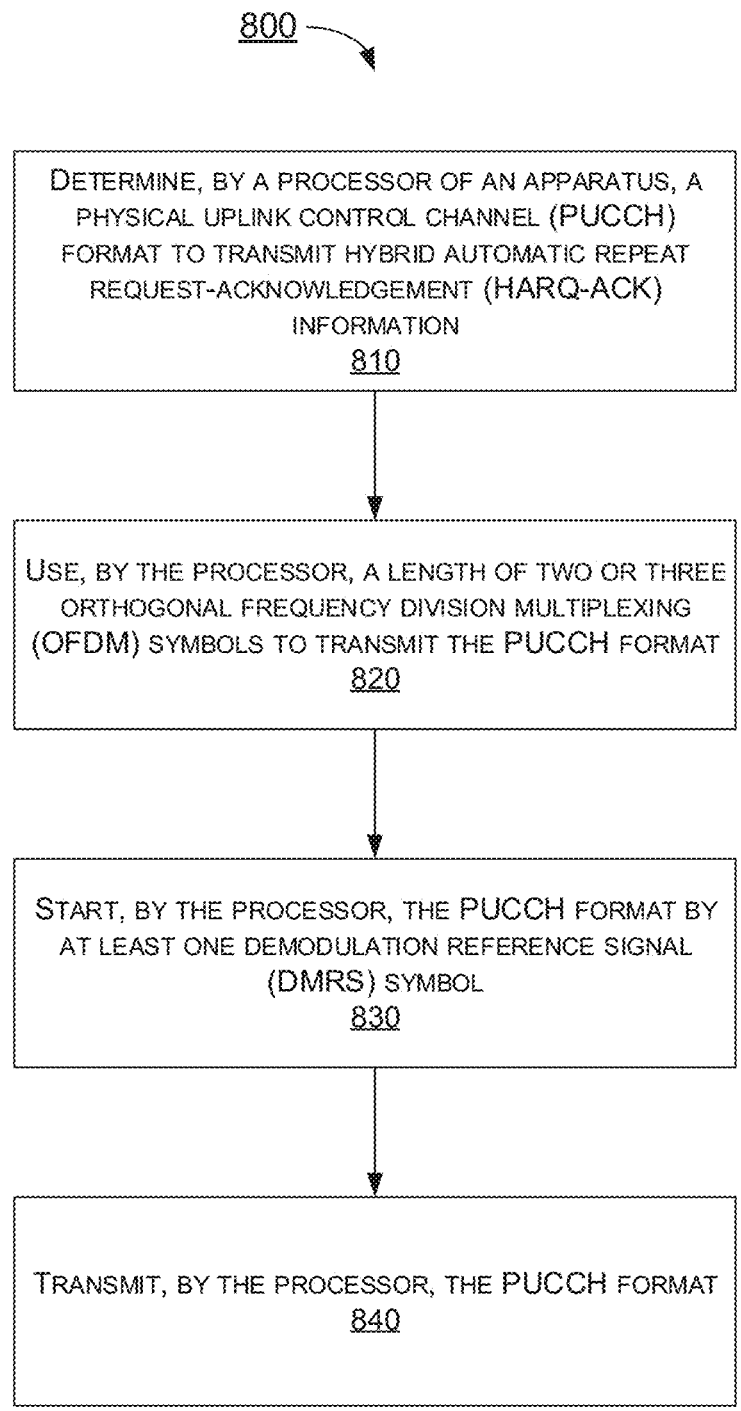
FIG. 8 is a flowchart of an example process in accordance with an implementation of the present disclosure.

FIG. 8 illustrates an example process 800 in accordance with an implementation of the present disclosure. Process 800 may be an example implementation of schemes described above, whether partially or completely, with respect to PUCCH format enhancement with the present disclosure. Process 800 may represent an aspect of implementation of features of communication apparatus 510. Process 800 may include one or more operations, actions, or functions as illustrated by one or more of blocks 810, 820, 830 and 840. Although illustrated as discrete blocks, various blocks of process 800 may be divided into additional blocks, combined into fewer blocks, or eliminated, depending on the desired implementation. Moreover, the blocks of process 800 may executed in the order shown in FIG. 8 or, alternatively, in a different order. Process 800 may be implemented by communication apparatus 510 or any suitable UE or machine type devices. Solely for illustrative purposes and without limitation, process 800 is described below in the context of communication apparatus 510. Process 800 may begin at block 810.

At 810, process 800 may involve processor 512 of apparatus 510 determining a PUCCH format to transmit HARQ-ACK information. Process 800 may proceed from 810 to 820.

At 820, process 800 may involve processor 512 using a length of two or three OFDM symbols to transmit the PUCCH format. Process 800 may proceed from 820 to 830.

At 830, process 800 may involve processor 512 starting the PUCCH format by at least one DMRS symbol. Process 800 may proceed from 830 to 840.

At 840, process 800 may involve processor 512 transmitting the PUCCH format. The PUCCH format may comprises at least one of a PUCCH format 1, a PUCCH format 3 and a PUCCH format 4.

In some implementations, process 800 may involve processor 512 overlapping, by the processor, the at least one DMRS symbol with a user equipment (UE) processing timeline.

In some implementations, process 800 may involve processor 512 arranging the PUCCH format by a plurality of DMRS symbols followed by at least one the HARQ-ACK information.

In some implementations, process 800 may involve processor 512 transmitting the DMRS symbol and HARQ-ACK information over non-contiguous OFDM symbols.

In some implementations, process 800 may involve processor 512 transmitting the PUCCH format by cyclic-delay diversity (CDD) over two transmit antennae.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method, comprising:
  receiving, by a processor of an apparatus, a physical downlink control channel (PDCCH) on a first component carrier (CC);
  receiving, by the processor, a physical downlink shared channel (PDSCH) on the first CC scheduled by the PDCCH;
  determining, by the processor, a second CC to transmit a physical uplink control channel (PUCCH) according to a configuration of dynamic switching of CC; transmitting, by the processor, the PUCCH corresponding to the PDSCH on the second CC scheduled by the PDCCH;
  receiving, by the processor, the PDCCH on second CC;
  receiving, by the processor, the PDSCH on the second CC scheduled by the PDCCH;
  determining, by the processor, the first CC to transmit the PUCCH according to the configuration of dynamic switching of CC; and
  transmitting, by the processor, the PUCCH corresponding to the PDSCH on the first CC scheduled by the PDCCH.

2. The method of claim 1, wherein the configuration comprises a plurality of CCs configured to be used to transmit the PUCCH.

3. The method of claim 1, further comprising:
receiving, by the processor, a configuration configuring a plurality of CCs within a cell group that can be used to transmit the PUCCH.

4. The method of claim 1, wherein a content carried by the PUCCH is independent from the determined second CC.

5. The method of claim 1, wherein the configuration comprises a physical layer signaling.

6. The method of claim 1, wherein the configuration comprises a data field used to select a CC from a plurality of different CCs to transmit the PUCCH.

7. A method, comprising:
receiving, by a processor of an apparatus, a physical downlink control channel (PDCCH) on a first component carrier (CC);
receiving, by the processor, a physical downlink shared channel (PDSCH) on the first CC scheduled by the PDCCH;
determining, by the processor, a second CC to transmit a physical uplink control channel (PUCCH) according to a configuration of dynamic switching of CC;
transmitting, by the processor, the PUCCH corresponding to the PDSCH on the second CC scheduled by the PDCCH, wherein the configuration comprises an indication indicating an earliest uplink sub-slot over a plurality of CCs.

8. A method, comprising:
receiving, by a processor of an apparatus, a physical downlink control channel (PDCCH) on a first component carrier (CC);
receiving, by the processor, a physical downlink shared channel (PDSCH) on the first CC scheduled by the PDCCH;
determining, by the processor, a second CC to transmit a physical uplink control channel (PUCCH) according to a configuration of dynamic switching of CC;
transmitting, by the processor, the PUCCH corresponding to the PDSCH on the second CC scheduled by the PDCCH, wherein the configuration comprises a data field used to select a CC and a sub-slot.

9. The method of claim 1, wherein the first CC and the second CC comprise different numerologies or sub-slot partitioning configurations.

10. The method of claim 1, further comprising:
determining, by the processor, the second CC to transmit a physical uplink shared channel (PUSCH) according to the configuration of dynamic switching of CC; and
transmitting, by the processor, the PUSCH on the second CC scheduled by the PDCCH.

11. The method of claim 1, further comprising:
determining, by the processor, to receive the PDSCH on the second CC according to the configuration of dynamic switching of CC; and
receiving, by the processor, the PDSCH on the second CC scheduled by the PDCCH.

* * * * *